United States Patent

[11] 3,601,081

| [72] | Inventors | William M. Smith; Francis N. Wroble, both of Wetherfield, Conn. |
|---|---|---|
| [21] | Appl. No. | 6,162 |
| [22] | Filed | Jan. 27, 1970 |
| [45] | Patented | Aug. 24, 1971 |
| [73] | Assignee | The Ensign-Bickford Company Simsbury, Conn. |

[54] TRIGGER MECHANISM FOR PASSENGER-RESTRAINING SAFETY DEVICE
3 Claims, 4 Drawing Figs.

[52] U.S. Cl. .................................................. 116/114 AH, 73/492, 280/150 AB
[51] Int. Cl. .................................................... G01p 15/00
[50] Field of Search ............................................. 73/492; 200/61.45, 61.53; 116/114.29; 280/150 AB

[56] References Cited
UNITED STATES PATENTS

| 2,057,380 | 10/1936 | Keefe | 335/180 |
| 2,573,199 | 10/1951 | Holman | 200/61.53 |
| 3,267,739 | 8/1966 | Epps et al. | 73/492 |
| 3,495,675 | 2/1970 | Hass et al. | 280/150 X |

Primary Examiner—Richard C. Queisser
Assistant Examiner—Herbert Goldstein
Attorney—Prutzman, Hayes, Kalb & Chilton ABSTRACT: A directional trigger mechanism responsive to a predetermined decelerating or impact force for explosively deploying a passenger-restraining safety device in a vehicle comprises a compact housing having first and second passages intersecting at substantially a right angle with the second passage extending laterally from the first passage at a point intermediate the ends thereof. A slidable weight positioned within the second passage carries a firing pin on one end thereof and a spherical cam portion on the opposite end thereof, the cam portion being disposed within the intersection of said first and second passages when the weight is in its retracted cocked position. A pair of weight retaining and driving spheres are positioned within the first passage and are biased into engagement with opposite sides of the spherical cam portion to releasably retain the firing pin in its cocked position and positively drive the weight toward its actuating position upon release from the cocked position.

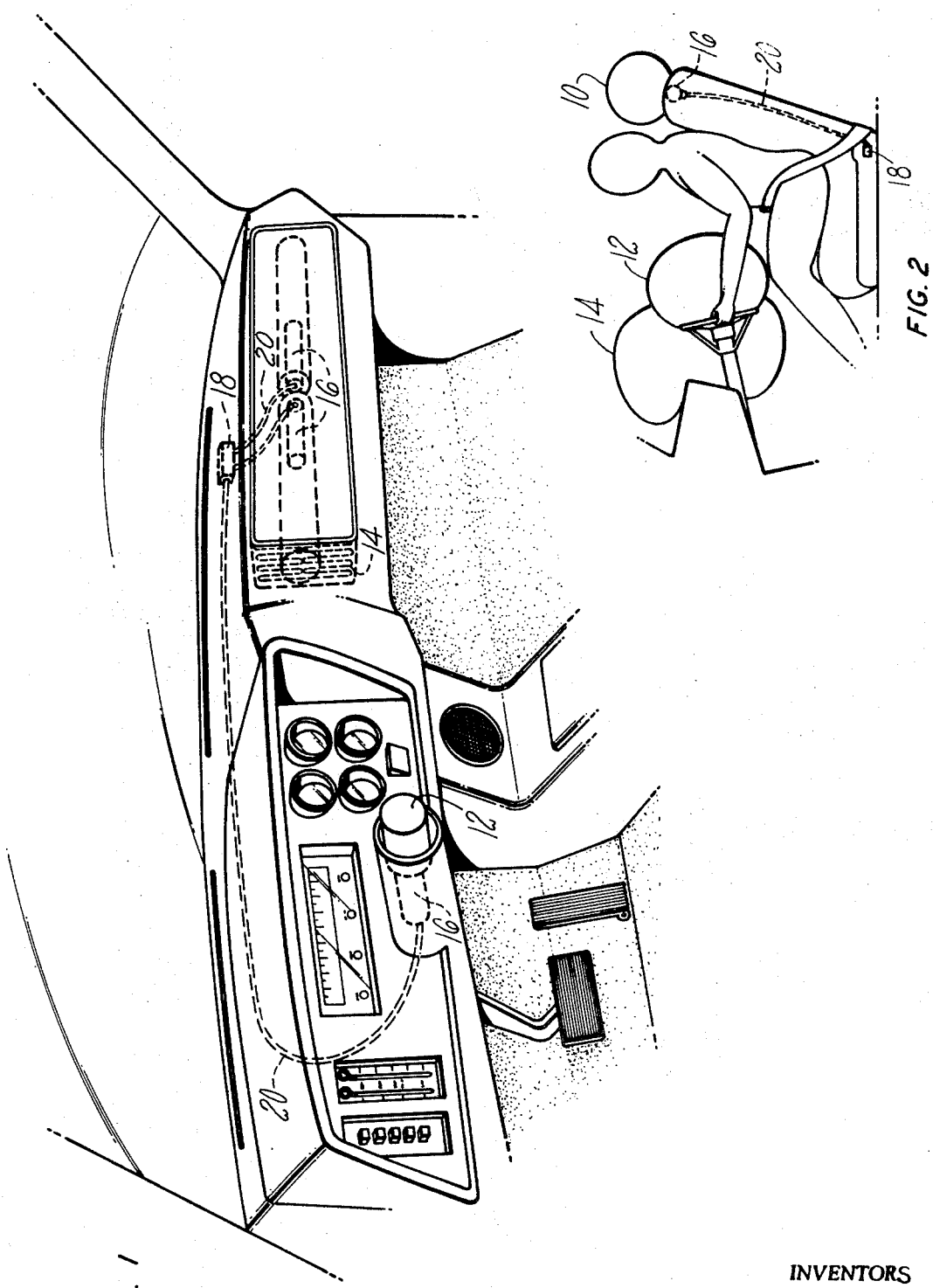

Patented Aug. 24, 1971 3,601,081

TRIGGER MECHANISM FOR PASSENGER-RESTRAINING SAFETY DEVICE

BACKGROUND AND SUMMARY OF THE INVENTION

The present invention relates generally to safety systems for protecting the occupants of a vehicle from injury upon rapid deceleration or impact of the vehicle. More particularly, it is concerned with a new and improved trigger mechanism for sensing a sudden impact condition and initiating the deployment of an inflatable confining device.

Safety systems utilizing inflatable restraining devices to protect an occupant of the vehicle are well known. The systems generally employ an inflatable pillow or other confinement which is automatically inflated in response to a predetermined impact force condition on to prevent the occupant of the vehicle from incurring serious injury as a result of impact with the interior structure of the vehicle. The restraining pillows are deployed by a triggering device capable of sensing the condition and transmitting a suitable signal to an explosive charge for rapidly releasing a sufficient amount of gas to inflate the pillows. As will be appreciated, the triggering device must have sufficient sensitivity to provide positive and reliable actuation at impact force conditions exceeding a certain predetermined value yet at the same time be nonresponsive to conditions of low impact force. Additionally, it is necessary for the trigger mechanism to exhibit rapidly responsive operation since the safety bag should be fully deployed in less than 90 milliseconds and preferably in less than 50 milliseconds.

Accordingly, it is an object of the present invention to provide a new and improved trigger mechanism useful in a vehicle safety system of the type described which provides rapid actuation, reliable and efficient operation and the sensitivity to distinguish between a true crash condition and the occurrence of an impact condition below a predetermined threshold level.

Another object of the present invention is to provide a new and improved impact sensing device of the type described exhibiting a high degree of acceleration sensitivity with a very small spread between no-fire and all-fire conditions. Included in this object is the provision for a trigger mechanism having force-duration sensitivity levels which will consistently provide a no-fire condition at 4 $g$ and an all-fire condition at a sensitivity threshold at or above 6 $g$ over a period of 10 milliseconds.

Still another object of the present invention is to provide a new and improved trigger mechanism of the type described having a smoothly functioning, simple and reliable operating mechanism capable of being constructed in a compact, yet highly durable form.

A further object of the present invention is to provide a directionally responsive trigger mechanism of the type described exhibiting high sensitivity to an impact force along a predetermined direction for the selective actuation of particular portions of a safety crash system.

A still further object of the present invention is to provide a trigger mechanism of the type described incorporating inertial mass cocking means which assist in driving the mass toward its actuating position.

Other objects will be in part obvious and in part pointed out more in detail hereinafter.

These and related objects are accomplished in accordance with the present invention by providing a directional trigger mechanism comprising a compact support member having first and second passages intersecting at substantially a right angle and an elongated inertial mass carried by the support member within one of the passages for slidable movement therealong between a cocked position and an actuating position. The inertial mass carries a firing pin or actuator on one end thereof and 2n integral generally spherical cam portion spaced from the firing pin. A pair of mass retaining and driving spheres are positioned within the other passage of the support member and are biased into engagement with opposite sides of the cam portion to releasably retain the firing pin in a cocked position and positively drive the inertial mass toward its actuating position upon release. As a result of a predetermined acceleration or impact force along the axis of movement of the inertial mass, the cam portion thereof moves against the biasing force on the spheres and crosses their common axis to release itself from the cocked position. This enables the inertial mass and its firing pin to be driven by the spheres into a full actuation position for initiating deployment of a safety pillow.

A better understanding of the objects, advantages, features, properties and relationships of the invention will be obtained from the following detailed description and accompanying drawings which set forth an illustrative embodiment and are indicative of the way in which the principle of the invention is employed.

BRIEF DESCRIPTION OF THE DRAWINGS

In the drawings:

FIG. 1 is a perspective view of the frontal structure portion of an automobile passenger compartment schematically illustrating a typical inflatable safety system installed therein prior to deployment;

FIG. 2 is a schematic side elevational view of the compartment of a motor vehicle illustrating a safety system after deployment in response to operation of the trigger mechanism of the present invention;

DESCRIPTION OF A PREFERRED EMBODIMENT

Figure 3:
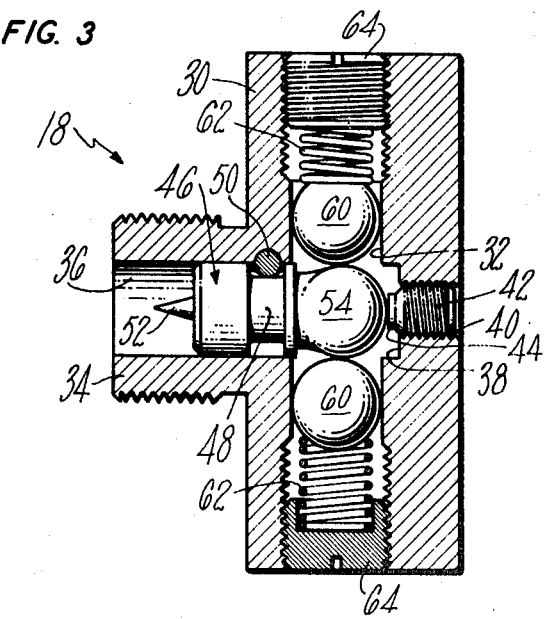
FIG. 3 is a sectional view of an impact-sensing trigger mechanism embodying the features of the present invention, the internal components of the trigger mechanism being shown in their cocked position.

Referring now to the drawings in greater detail, wherein like reference numerals indicate like parts throughout the several figures, the invention is illustrated as being incorporated in an inflatable safety system installed within the passenger compartment of an automobile. It will, of course, be appreciated that the invention is adaptable to the other vehicles and systems and may be employed for similar yet diversified uses. However, for clarity of description and ease of understanding, the invention will be described in connection with its preferred use within an automobile inflation safety system and particularly in connection with an explosive signal transmission system independent of the electrical system of the vehicle.

As shown, the system may be incorporated in the dashboard and other frontal structural components generally located in front of an occupant of the vehicle or as part of a headrest structure (see Fig. 2). The system illustrated in the drawings includes a plurality of inflatable restraining bags or pillows suitably located in a contracted condition in front of and behind the occupant of the vehicle. These restraining members may take the form of an inflatable headrest 10, steering post cushion 12 or passenger-restraining shield 14.

Regardless of the particular mode or construction employed for the inflatable device, the system generally also includes a suitable member, generally designated by the numeral 16, for delivering gas to the inflatable pillows upon receipt of an appropriate signal from an impact sensor 18. The gas-delivering member may take the form of a cylinder of compressed gas having an explosive charge associated therewith for opening the cylinder or a pyrotechnic gas-generating charge similar to that disclosed in our copending U.S. Pat. application Ser. No. 6163 filed on even date herewith. The pyrotechnic gas-generating charge is fired by an igniter, detonator or other suitable device upon receipt of a signal through the signal transmission line 20. In the particular embodiment used for illustrative purposes, the signal transmission line is a detonating cord comprising an explosive cord 22 of PETN, RDX or similar material encased in a suitable covering 24 capable of confining the products of detonation. Other signal transmission lines, such as electrical wires, have been used effectively for this purpose but as mentioned hereinbefore it is preferred that the entire system be independent of the electrical system of the vehicle.

As mentioned, the operation of the system is controlled by a sensing device 18 capable of immediate response to a predetermined force condition such as might occur when the vehicle is involved in a collision. Although only a single sensing device 18 is illustrated as being associated with one or more inflatable pillows, it will be understood that a plurality of sensors responsive to different directional forces could be operatively connected to a single inflatable restraining device. Where, as in the present invention, the sensor or trigger mechanism is of compact construction, it would be advantageous to provide an extra mechanism of slightly different impact sensitivity as a "backup" for the primary device.

Figure 4:
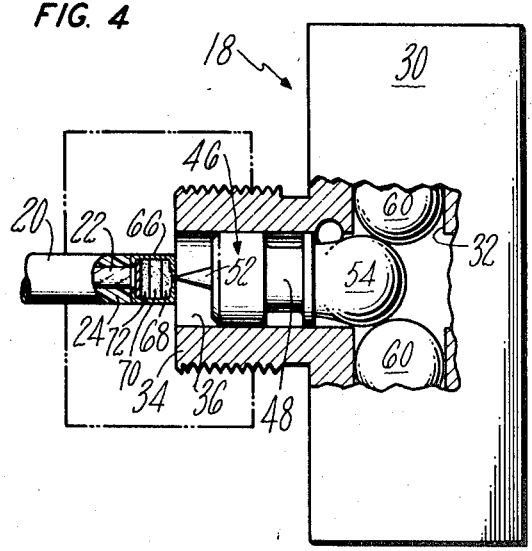
FIG. 4 is a fragmented sectional view of the trigger mechanism of FIG. 3 in conjunction with an explosive signal transmission line, the trigger mechanism being depicted after release of the firing pin from its cocked position and at the instant immediately prior to initiation of the explosive signal.

Referring now to Figs. 3 and 4, the impact responsive trigger mechanism forming a preferred structure of the present invention is of generally T-shaped external configuration and comprises an elongated central body portion 30 having a first passage 32 of generally cylindrical configuration extending longitudinally along its entire length. A side extension 34 integral with the main body portion 30 extends laterally from one side substantially midway between the ends thereof and defines a second cylindrical passage 36 which intersects the first passage 32 at substantially a right angle thereto. The second passage not only extends along the full length of side extension 34 to provide communication between the first passage and the exterior of the trigger mechanism but also across the first passage and continues there beyond for a short distance to form a recess 38 within the side wall of the central body portion opposite the side extension. A threaded aperture 40 axially aligned with the second passage communicates with the recess 38 through the sidewall and threadably receives a setscrew 42, the innermost end 44 of which extends into the recess 38.

An inertial mass or weight, designated generally by the numeral 46, is slidably mounted within the second passage 36 for movement between a forward actuating position and the retracted cocked position illustrated in FIG. 3. The slidable weight is a generally cylindrical member provided with a peripheral circumscribing recess 48 about midway along its length. The recess readily receives a safety pin 50 which extends through the central body portion of the housing at a location adjacent the juncture between the first and second passages and prevents inadvertent movement of the weight 46 out of its cocked position. The outermost or forward end of the weight is provided with a sharply pointed firing pin 52 of sufficient length to project substantially beyond the side extension 34 when the weight is in its forward or actuating position. An integral generally spherical cam portion 54 having a diameter only slightly less than the diameter of the passages is provided on the end of the weight opposite the firing pin. As shown in FIG. 3 the cam portion extends into the recess 38 and is located therein by the limiting action of the setscrew 42.

A pair of pin retaining and driving members operate against opposite sides of the spherical cam portion 54 to releasably retain the weight in its cocked position. These members take the form of spheres or balls 60 having substantially the same radius as the cam portion. The spheres are located within the first passage 32 on opposite sides of the intersection formed by the passages and are each biased into firm abutting engagement with the arcuate camming surface of the cam portion by means of individual compression springs 62 confinably retained within the first passage by the plugs 64 threadably received within opposite ends thereof. The balls 60 are mounted within the first passage in substantial coaxial alignment and, because the center of the spherical cam portion 54 of the weight is not in coaxial alignment therewith, tend to drive the center of the cam portion away from an aligning position therewith. As mentioned, in its cocked position the cam portion extends toward and into the recess but is held against substantial rearward movement by the end 44 of the setscrew projecting into recess 38. Thus, its center is located rearwardly of the line of coaxial alignment of the retaining balls 60 and the closing force thereof further urges the cam portion toward the setscrew for retention of the weight within its cocked position. It will, of course, be appreciated that the exact location of the setscrew may be varied as may the position of the spring-retaining plugs so as to control the trip force which must be exerted upon the weight in order to move it to the left as viewed in FIG. 3.

When appropriate force acting on the trigger mechanism along the direction of movement of the weight causes movement of the weight to the left as viewed in FIG. 3, the cam portion thereof will drive the retaining balls 60 outwardly along its camming surface against the bias of the drive springs 62 until the center of the cam portion crosses the line of coaxial alignment of the balls. As this occurs, the retaining function of the balls 60 immediately converts to a driving function which continuously urges the weight toward its actuating position under the influence of the drive springs 62.

As shown, the firing pin 52 located on the forwardmost end of the weight 46 will be driven into engagement with a suitably responsive member for initiating the transmission of a firing signal. In the particular system illustrated in FIG. 4, the signal transmission line 20 takes the form of a confined detonating cord in abutting engagement with a stab detonator 66 responsive to the operation of the firing pin 52. Although the construction of the detonator 66 may vary, it generally contains at least a primary charge 68 and one or more output charges as indicated by the numerals 70, 72.

The simplicity of the trigger mechanism facilitates the construction of not only a compact unit but also one capable of ready adjustment to provide an extremely high acceleration sensitivity. Thus, by properly controlling the location of the setscrew and the retaining force exerted by the springs, it is possible to readily provide a trigger mechanism which reliably exhibits a no-fire level of 4 g and at the same time provides a force-duration always-fire level of 6 g at 10 milliseconds. Additionally, it is a feature of the present invention that the retaining means which prevents operation of the trigger mechanism below a certain acceleration sensitivity level fully releases the inertial mass once that level is reached and converts to assist in driving the firing pin toward its actuating position.

As will be apparent to persons skilled in the art, various modifications, adaptations and variations of the foregoing specific disclosure can be made without departing from the teachings of the present invention.

We claim:

1. A directional trigger mechanism responsive to an inertial force for explosively deploying a passenger-restraining safety device in a vehicle independently of the electrical system of the vehicle comprising a support member having an elongated body portion provided with a first passage extending along the length thereof and a side extension projecting from said body portion and having a side passage extending laterally from said first passage along the entire length of said side extension; an elongated inertial mass having an actuator on one end thereof and a spherical camming surface on the opposite end thereof, said inertial mass being positioned within said side passage for slidable movement therealong between a cocked position and an actuating position in response to said inertial force; a pair of drive spheres of substantially the same diameter as the spherical camming surface coaxially positioned within said first passage on opposite sides of the camming surface, said spherical camming surface being disposed within the intersection of said passages with its geometric center displaced relative to the aligned centers of the drive spheres when the inertial mass is in its cocked position and said actuator projecting outwardly from said side passage when the inertial mass is in its actuating position; as biasing means constantly biasing said drive spheres into intimate engagement with said spherical camming surface for releasably retaining said inertial mass within its cocked position and driving said actuator toward its actuating position upon release from its cocked position.

2. trigger mechanism of claim 1 including adjustable stop means on the support in axial alignment with said side passage limiting movement of the inertial mass out of the cocked position in a direction away from the actuating position and for controllably adjusting the force required to move the inertial mass out of its cocked position.

3. The trigger mechanism of claim 1 wherein said inertial mass is movable along a first axis and the drive spheres are movable along a second axis disposed substantially perpendicular to said first axis, said biasing means constantly applying a converging force to said drive spheres along said second axis, said force being transferred between said drive spheres and said camming surface through point contact therebetween.